March 11, 1958 — W. BADER — 2,825,959
TOOL HOLDER
Original Filed May 26, 1951
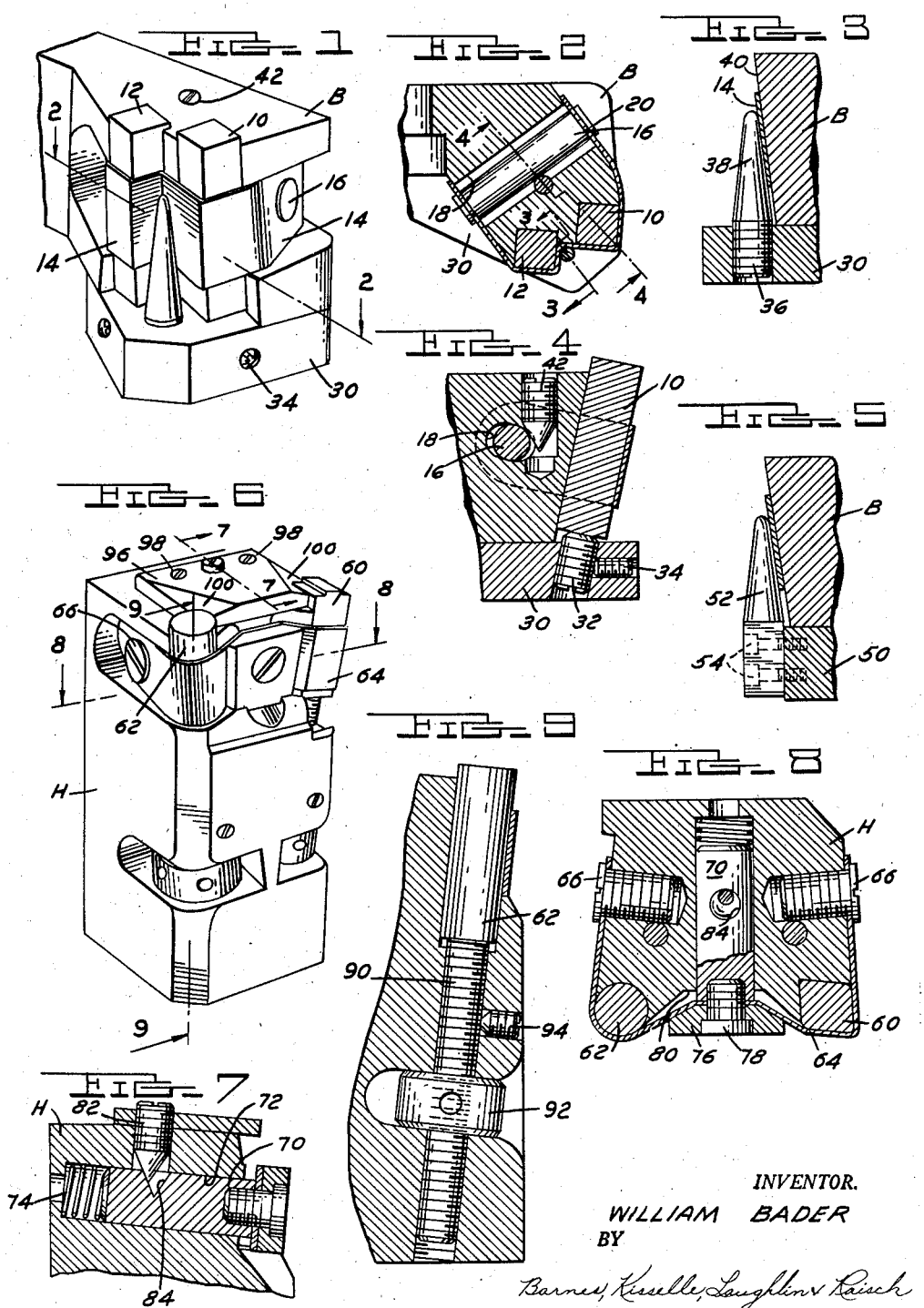
INVENTOR.
WILLIAM BADER
BY
Barnes, Kisselle, Laughlin & Raisch
ATTORNEYS

United States Patent Office 2,825,959
Patented Mar. 11, 1958

2,825,959

TOOL HOLDER

William Bader, Ferndale, Mich., assignor to Wesson Multicut Company, Ferndale, Mich., a corporation of Michigan Original application May 26, 1951, Serial No. 228,412, now Patent No. 2,687,563, dated August 31, 1954. Divided and this application June 3, 1954, Serial No. 434,240

1 Claim. (Cl. 29—96)

This invention relates to a tool holder and has particularly to do with that type of holder in which a cutting bit is held in place on a tool body by a band-type of holder which surrounds the tool on one side and is tensioned to hold the tool in a recess in the body.

Reference is made to applicant's United States Patent No. 2,624,103.

This application is a division of my co-pending application Serial No. 228,412, filed May 26, 1951, now issued August 31, 1954, into Patent No. 2,687,563.

The invention disclosed in this and the above co-pending application constitutes an improvement over the holding device illustrated in the aforesaid patent.

The object of the present invention is the provision of an adjustment plate which can be utilized by an operator to determine exact location for a tool bit without measurement and prior to assembly of the bit into the machine. The adjustment devices are removable and replaceable for alteration and substitution. The exact locating surfaces are provided for the insert so that by reference between the top plane and the lower elevating device the insert is accurately positioned.

Drawings accompany the application, and the various views thereof may be briefly described as:

Figure 1, a perspective view of one modification of the invention.

Figure 2, a sectional view on line 2—2 of Figure 1.

Figures 3 and 4, sectional views on lines 3—3 and 4—4 of Figure 2.

Figure 5, a sectional view of a modified construction somewhat similar to that shown in Figure 3.

Figure 6, a second modification showing a tool block in perspective with two cutting inserts.

Figures 7, 8 and 9, sectional views on lines 7—7, 8—8 and 9—9, respectively, of Figure 6.

A band holding device for tool inserts of the solid carbide type has been previously described in my Patent No. 2,624,103.

In some installation it has been found that close spacing of two inserts for cuts which are close together requires that the inserts be mounted on the same tool holder. This same space limitation prevents the use of the standard holding construction as shown in the aforesaid patent.

In the present case, as shown in Figure 1, the inserts are nested in recesses in a tool body B. The inserts shown at 10 and 12 are more or less in parallel relation, and a band 14 passes around the inserts, the ends extending back to a pin 16.

The pin 16 is positioned in a cross bore 18 which, as shown in Figure 4, has an oval cross section to permit shifting of the pin. The ends of the pin have grooves 20 to receive the rear margins of holes in the ends of the band 14. The pin 16 is dimensioned to pass through these holes.

Below the tool body B is a base plate 30 which is suitably fastened rigidly to the body by means not shown. In this base plate a backing screw 32 passes upwardly at an angle to serve as a backing for the insert 10 (see Figure 4).

A similar construction is used for insert 12. A locking screw 34 is used for the adjusting screw 32. Also extending upwardly through the plate 30 is a threaded pin 36 with a tapered head 38.

The head is tapered in such a way as to have a surface paralleling the wall 40 of the base B, and thus the band 14, which is interposed between the head 38 and the wall 40, is held tightly against the wall.

When a backward thrust is placed against pin 16 by conically ended screw 42, shown in Figure 4, pressure is transmitted through each end of the band 14 to the respective inserts 10 and 12.

The anchor post 38 insures tension on the band and prevents an unfolding action. With this arrangement the two solid carbide inserts 10 and 12 are urged back into the recesses in the body with sufficient rigidity that they can perform the cutting operation assigned to them.

In Figure 5 a modification is shown in which the base plate 50 is necessarily shorter, and a modified anchor post 52 is fastened to the end of the base plate by small bolts 54.

In Figure 6 a block type of insert holder is shown for a certain type of cutting operation wherein the holder block H rests on a plate when in operation. With this arrangement all controlling units must be available above the base.

Inserts 60 and 62 are held in recesses in the corners of the block by a band 64, the ends of which are anchored by headed screws 66.

As shown best in Figures 7 and 8, a plunger 70 slides in a bore 72. This plunger extends transversely of the body and is backed by a spring 74.

The band 64 is perforated centrally thereof and locked to the end of the plunger 70 by a lug 76 and a bolt 78 passing through the lug and the band into the end of the plunger 70.

The surface of the body H adjacent the end of the plunger opening is formed at 80 to receive the lug 76 and the band. Therefore, the plunger may be moved inwardly into the body by a conically ended screw 82 which co-operates with a conical recess 84 in the side of the plunger.

As shown in Figure 7, screwing in the small screw 82 will force the plunger back against the spring 74 and draw tight the band 64 against the inserts 60 and 62, the ends of the band being securely anchored by the bolts 66.

Backing screws required for the inserts 60 and 62 are shown at 90 in Figure 9 to be controlled by a knurled nut 92 and locked by a screw 94. On the top of the block H is an adjustment screw plate 96 held in place by screws 98. This screw plate has ground corners 100 which position directly adjacent the inserts 60 and 62 and permit finger nail adjustment of the inserts in their outward movement.

The plate 96 may be varied in thickness, depending on which dimension is required at the top of the tool. The surfaces 100 may be ground to any desired angle or dimension. It is then possible to have the top of the tool bit exactly flush with the surface 100; and when the operator achieves this position, he knows that the tool is properly adjusted for cutting without further measurement. If desired, the plate may also be combined with a chip-breaker surface; and it will then perform two functions, one of location and the other of providing suitable chip removal.

I claim:

In a tool holder of the type having an elongate bit recess open at the side and one end and disposed at an angle to provide work clearance, and having also means to adjust a bit longitudinally to a proper cutting position and means to clamp a bit in said recess, a body having such elongate open-sided, open-ended recess, and means for positioning a bit in said body comprising a gauge block fastened to said body directly adjacent said recess, said block being shaped at one edge to correspond with the walls of the bit insert recess and to form a continuation thereof at the open end, and said block having a surface angled to lie in a plane referenced transversely of the axis of said recess wherein said plane will align exactly with the top surface of an insert when in proper cutting position relative to said body, and releasable means for fastening said block on said body wherein said block is removable and replaceable to permit change of said reference plane relative to said body without altering the body.

References Cited in the file of this patent

UNITED STATES PATENTS

| | | |
|---|---|---|
| 1,991,494 | Dempsey | Feb. 19, 1935 |
| 2,628,415 | Brown | Feb. 17, 1953 |
| 2,649,647 | Sternbergh et al. | Aug. 25, 1953 |

FOREIGN PATENTS

| | | |
|---|---|---|
| 174,575 | Great Britain | May 11, 1922 |
| 494,973 | Germany | Mar. 31, 1930 |
| 234,828 | Switzerland | Oct. 31, 1944 |